United States Patent
Dalsgaard et al.

(10) Patent No.: US 9,644,610 B2
(45) Date of Patent: May 9, 2017

(54) WARNING A WIND TURBINE GENERATOR IN A WIND PARK OF AN EXTREME WIND EVENT

(75) Inventors: Søren Dalsgaard, Hadsten (DK); Jesper Sandberg Thomsen, Hadsten (DK); Per Brath, Randers NV (DK); Martin Ansbjerg Kjær, Harlev J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 663 days.

(21) Appl. No.: 13/312,732

(22) Filed: Dec. 6, 2011

(65) Prior Publication Data

US 2013/0144449 A1 Jun. 6, 2013

(51) Int. Cl.
  *G05B 9/02* (2006.01)
  *F03D 7/04* (2006.01)
(52) U.S. Cl.
  CPC ........ *F03D 7/048* (2013.01); *F05B 2270/107* (2013.01); *Y02E 10/723* (2013.01)
(58) Field of Classification Search
  CPC ..... Y02E 10/723; Y02E 10/74; F03D 7/0224; F03D 7/0204; F03D 7/048; F03D 7/042; F03D 1/065; F03D 7/04; F05B 2270/32; F05B 2240/132
  USPC .......... 700/286, 287, 291, 295, 297; 290/44; 702/127
  See application file for complete search history.

(56) References Cited

U.S. PATENT DOCUMENTS

| 6,784,566 B2 | 8/2004 | Thomas | |
| 8,108,079 B2* | 1/2012 | Wobben | F03D 7/0204 290/44 |
| 8,489,247 B1* | 7/2013 | Engler | 700/291 |
| 8,606,416 B2* | 12/2013 | Larsson | G06Q 10/04 700/22 |
| 2004/0258521 A1 | 12/2004 | Wobben | |
| 2005/0042100 A1 | 2/2005 | Wobben | |
| 2007/0001461 A1* | 1/2007 | Hopewell | H02J 3/383 290/44 |
| 2007/0124025 A1* | 5/2007 | Schram | F03D 7/0224 700/287 |

(Continued)

FOREIGN PATENT DOCUMENTS

| JP | 2007285214 A | 11/2007 | |
| WO | WO 2010130721 A1 * | 11/2010 | ........... F03D 7/0224 |

OTHER PUBLICATIONS

Danish Search Report for PA 2011 70672, Oct. 29, 2012.

(Continued)

*Primary Examiner* — Darrin Dunn
(74) *Attorney, Agent, or Firm* — Patterson + Sheridan, LLP

(57) ABSTRACT

The disclosure is provides for warning a wind turbine generator (WTG) in a wind park of an extreme wind event. According to one embodiment, one or more front line WTGs of the wind park that detect extreme wind events and provide the warning are adaptively selected based on a measured wind direction. Thus, the selection of front line WTGs is adaptive to changing wind conditions. In another embodiment, a wind park includes a group of one or more WTGs of a first type located in an inner region of the wind park and a plurality of WTGs of a second type located in an outer region of the wind park that at least partially surrounds the inner region. The first type of WTG is structurally weaker and/or rated for higher performance than the second type of WTG.

22 Claims, 13 Drawing Sheets

(56) References Cited

U.S. PATENT DOCUMENTS

| | | |
|---|---|---|
| 2008/0152492 A1 | 6/2008 | Fein et al. |
| 2009/0099702 A1* | 4/2009 | Vyas ................. F03D 7/0292 700/287 |
| 2009/0295165 A1* | 12/2009 | Giguere ................. G06Q 10/06 290/55 |
| 2010/0078940 A1 | 4/2010 | Kondo et al. |
| 2010/0115951 A1 | 5/2010 | Pedersen |
| 2010/0138201 A1* | 6/2010 | Gundling ................. F03D 1/006 703/9 |
| 2010/0187828 A1 | 7/2010 | Reidy et al. |
| 2011/0046803 A1 | 2/2011 | Kondo et al. |
| 2011/0153096 A1* | 6/2011 | Pal et al. ..................... 700/287 |
| 2011/0187106 A1 | 8/2011 | Ichinose et al. |
| 2011/0193344 A1* | 8/2011 | Lafferty et al. ................. 290/44 |
| 2011/0208483 A1 | 8/2011 | Dilkina et al. |
| 2011/0295438 A1* | 12/2011 | Rogers ................. F03D 7/0204 700/287 |
| 2012/0010755 A1* | 1/2012 | Stapelfeldt .................... 700/287 |
| 2012/0059638 A1* | 3/2012 | Garate lvaro ......... F03D 7/0224 703/9 |
| 2012/0200086 A1* | 8/2012 | Kang et al. .................... 290/44 |
| 2013/0033040 A1* | 2/2013 | Bowyer et al. ................. 290/44 |
| 2013/0116831 A1* | 5/2013 | Rogers ................. F03D 7/0204 700/275 |
| 2013/0221676 A1* | 8/2013 | Caldwell ................ F03D 9/001 290/55 |
| 2013/0255363 A1* | 10/2013 | Merida ................... F03D 7/048 73/112.01 |

OTHER PUBLICATIONS

Mustakerov I et al: "Wind turbines type and number choice using combinatorial optimization", Renewable Energy, Pergamon Press, Oxford, GB, vol. 35, No. 9, Sep. 1, 2010, pp. 1887-1894.

Gonzalez J S et al: "Optimization of wind farm turbines layout using an evolutive algorithm", Renewable Energy, Pergamon Press, Oxford, GB, vol. 35, No. 8, Aug. 1, 2010, pp. 1671-1681.

International Search Report for PCT/DK2012/050443, Apr. 10, 2013.

* cited by examiner

WARNING A WIND TURBINE GENERATOR IN A WIND PARK OF AN EXTREME WIND EVENT

FIELD OF THE INVENTION

The present invention relates generally to methods and systems for protecting wind turbine generators (WTGs) in a wind park from damage to due wind events or conditions, and in particular to methods and systems for warning a WTG in a wind park of an extreme wind event, such as a wind gust.

BACKGROUND OF THE INVENTION

Extreme wind events or conditions, such as wind gusts, are a common source of damage to modern wind turbine generators (WTGs). For example, if the blades of a WTG are pitched optimally to maximize rotational speed and/or aerodynamic torque and, therefore, increase power production, a sudden gust of wind could drastically increase loading on the blades, perhaps beyond design limitations. Thus, in many modern wind parks, each WTG in the park operates conservatively with a large robustness margin as a precaution against the possibility of an extreme wind event. However, such extreme wind events are relatively infrequent at many wind parks. Consequently, the WTGs of many modern wind parks operate inefficiently for much of the time to avoid the relatively rare possibility of damage that could be sustained due to extreme wind events.

U.S. Patent Application Publication Number 2007/0124025 (the '025 patent publication) describes a system in which a first wind turbine or turbine group in a wind park measures wind speed and direction and a central data processing unit predicts load impact on wind turbines downstream from a first wind turbine or turbine group. Control signals are then generated to reduce power of the downstream wind turbines to minimize extreme load impact. However, because wind frequently changes directions, a wind turbine might be downstream with respect to other wind turbines at one moment but switch to being upstream a moment later. Thus, it would appear that to accommodate wind direction changes, the system described in the '025 patent publication would in practice actually need to significantly limit the number of turbines that can receive the control signal to minimize extreme load impact. More specifically, it appears that the only turbines that can benefit from such a system must always be downstream with respect to at least one other turbine that monitors the wind speed and direction. Accordingly, the benefits the system of the '025 patent publication purportedly provides would in practice be quite limited.

In addition, the downstream turbines that receive controls signals to minimize extreme load impact do not appear to differ from the upstream turbine(s) that measure wind speed and direction. Thus, the downstream turbines do not appear to be designed to take advantage of their protected condition.

SUMMARY OF THE INVENTION

According to a first aspect the invention provides a method for warning a wind turbine generator (WTG) in a wind park of an extreme wind event. The method includes measuring a direction of wind ambient to the wind park and adaptively selecting, based at least partially on the measured wind direction, one or more WTGs of the wind park to serve as front line WTGs. The adaptively selected one or more WTGs are then operated defensively as a precaution against extreme wind events. Consequently, the wind park can have a partial ring of front line WTGs whose shape is adaptive to changing wind conditions, thereby allocating resources efficiently to improve power production.

In an embodiment of the method according to the first aspect of the invention, the method further includes detecting an extreme wind event and generating an extreme wind event warning at at least one of the one or more adaptively selected WTGs.

In another embodiment of the method according to the first aspect of the invention, the method further includes propagating the extreme wind event warning through the wind park from the at least one of the one or more adaptively selected WTGs that generates the extreme wind event warning to at least one unselected WTG in the wind park.

In another embodiment of the method according to the first aspect of the invention, the method further includes receiving the extreme wind event warning at at least one of the WTGs in the wind park that is not among the one or more adaptively selected WTGs and determining at each of the warned WTGs whether to operate the warned WTG defensively in response to receiving the extreme wind event warning.

In another embodiment of the method according to the first aspect of the invention, the method further includes receiving the extreme wind event warning at a central wind park controller. In addition, the central wind park controller selects which of the WTGs in the wind park are vulnerable to damage due to the extreme wind event and sends the extreme wind event warning to the vulnerable WTGs.

In another embodiment of the method according to the first aspect of the invention, the extreme wind event is: a wind gust, an extreme drop in wind velocity, an extreme directional change in wind, an extreme change in wind shear, extreme wind turbulence, or any combination thereof.

In another embodiment of the method according to the first aspect of the invention, adaptively selecting the one or more WTGs to operate defensively includes selecting a WTG that is likely to be first among the WTGs of the wind park to detect an extreme wind event based on the measured wind direction as a first one of the one or more WTGs to operate defensively. Moreover, for each of one or more WTGs in the wind park other than the selected first WTG, the method includes selecting the other WTG as an additional one of the one or more WTGs to operate defensively based at least partially on a distance between the other WTG and the selected first WTG.

In another embodiment of the method according to the first aspect of the invention, the method further includes at least each of the one or more adaptively selected WTGs is configured to adaptively select itself as one of the one or more WTGs to operate defensively.

In another embodiment of the method according to the first aspect of the invention, the wind park includes a central controller configured to adaptively select the one or more WTGs to operate defensively.

In another embodiment of the method according to the first aspect of the invention, the one or more adaptively selected WTGs are selected from among a group of WTGs located within an outer annular region of the wind park.

In another embodiment of the method according to the first aspect of the invention, the method further includes overrating performance of at least one of the WTGs in the wind park that is not among the one or more adaptively selected WTGs.

According to a second aspect the invention provides a wind park with extreme wind event warning protection. The wind park includes one or more WTGs of a first type located in an inner region of the wind park and a plurality of WTGs of a second type located in an outer region of the wind park that at least partially surrounds the inner region. The first type of WTG differs from the second type of WTG in at least one of the following ways: higher power rating, larger rotor diameter, lower rotor bearing strength, and lower blade strength. Consequently, the WTGs that are most often downstream, i.e., those of the first type located in the inner region, are able to take advantage of their protected condition by operating more cheaply and/or at a higher rating.

In another embodiment of the wind park according to the second aspect of the invention, each of the plurality of WTGs of the second type is configured to operate defensively as a precaution against damage due to extreme wind events and to detect an extreme wind event.

In another embodiment of the wind park according to the second aspect of the invention, at least one of the one or more WTGs of the first type is configured to receive a warning of the detected extreme wind event and to operate defensively in response to the indication.

In another embodiment of the wind park according to the second aspect of the invention, the wind park further includes a central controller configured to send the warning of the detected extreme wind event to the at least one of the one or more WTGs of the first type.

In another embodiment of the wind park according to the second aspect of the invention, each of the plurality of WTGs of the second type is configured to begin operating defensively depending at least in part on a direction of ambient wind.

According to a third aspect the invention provides a first WTG configured for placement in an outer region of a wind park including a plurality of WTGs. The first WTG includes a climate condition sensor system and a controller. The climate condition sensor system is configured to measure at least a direction of wind ambient to the first WTG. The controller is configured to cause the first WTG to begin operating defensively in dependence on the measured wind direction or, regardless of the measured wind direction, if a warning is received from a second WTG in the wind park of an approaching extreme wind event. Thus, the outer region WTGs can operate flexibly to facilitate wind direction adaptive selection of front line WTGs.

In another embodiment of the first WTG according to the third aspect of the invention, the climate condition sensor system is further configured to detect an extreme wind event. Furthermore, the controller is further configured to generate a warning to transmit to at least a third WTG located downstream from the first WTG in response to the climate condition sensor system detecting an extreme wind event.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
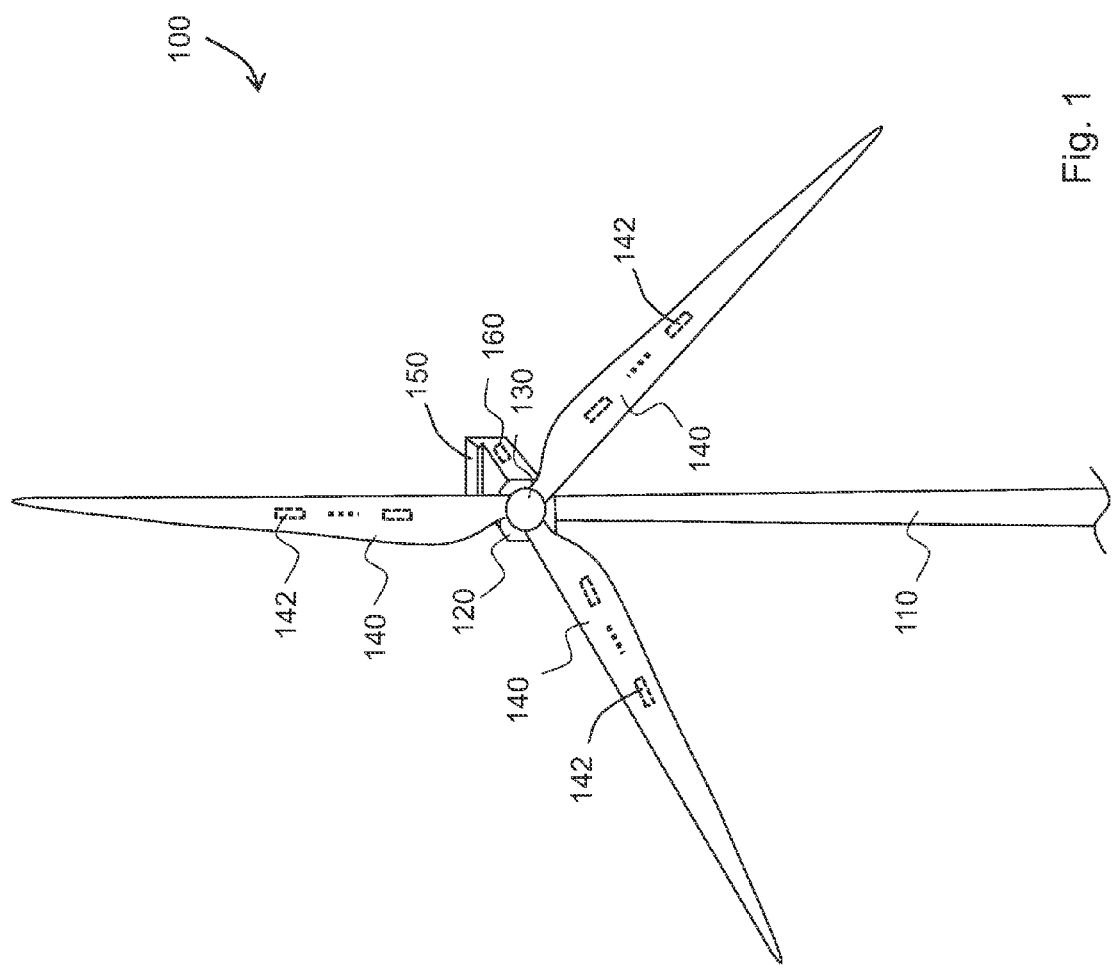
FIG. 1 shows a general structure of a wind turbine generator (WTG).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Example methods and systems described herein can be used to efficiently protect wind turbine generators (WTGs) in a wind park from damage due to sudden extreme wind events, such as wind gusts. For example, according to one embodiment, certain WTGs in the wind park are adaptively selected, based on a measured wind direction, to operate defensively. By adaptively selecting certain WTGs for defensive operation, the defensively operated WTGs can detect occurrence of an extreme wind event and a warning can be generated for the benefit of the WTGs not selected for defensive operation. Moreover, in making the selection adaptive to the measured wind direction, the number of WTGs needed to operate defensively may be minimized. For example, rather than operating all of the outermost WTGs in the wind park defensively, the selection of WTGs to operate defensively may be intelligently limited to those that are furthest upwind relative to other WTGs in the wind park and/or based on other criteria. In addition to adaptively selecting front line WTGs or as an alternative, the wind park may include a set of outer WTGs located within an outer annular region of the wind park that are more robust and/or rated for lower performance than a remaining set of inner WTGs.

In addition, according to other example methods and systems described herein, certain WTGs in a wind park may be identified in advance as being unlikely to be selected for defensive operation due to their being surrounded by other WTGs. Such inner WTGs may therefore be of a different type than the other WTGs in the wind park. For example, the inner WTGs may be built with a higher power rating, a larger rotor diameter, a lower rotor bearing strength, and/or a lower blade strength.

FIG. 1 illustrates an example WTG 100 according to an embodiment. As illustrated in FIG. 1, the WTG 100 includes a tower 110, a nacelle 120, and a rotor 130. In one embodiment, the WTG 100 may be an onshore wind turbine. However, embodiments of the invention are not limited only to onshore wind turbine. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the WTG 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 132 may further comprise mechanisms (not shown) for adjusting the pitch of the blade 140 to increase or reduce the amount of wind energy captured by the blade 140. Pitching adjusts the angle at which the wind strikes the blade 140. In certain embodiments, however, the pitching mechanisms may be omitted and, consequently, the pitch of the blades 140 cannot be adjusted in such embodiments.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the WTG 100 shown in FIG. 1 has three blades 140, it should be noted that a WTG may have a different number of blades. It is common to find WTGs having two to four blades. The WTG 100 shown in FIG. 1 is a Horizontal Axis Wind Turbine (HAWT) as the rotor 130 rotates about a horizontal axis. It should be noted that the rotor 130 may rotate about a vertical axis. Such a WTG having its rotor rotate about the vertical axis is known as a Vertical Axis Wind Turbine (VAWT). The WTG embodiments described henceforth are not limited to HAWTs having 3 blades. They may be implemented as both HAWTs and VAWTs, having any number of blades 140 in the rotor 130.

Each of the blades 140 may also be equipped with a bending moment sensor 142 (i.e., a load sensor), such as a strain-gauge, accelerometer, vibration sensor, or any other type of sensor capable of detecting at least a magnitude of a bending moment experienced by a WTG blade. The bending moment sensor 142 may be positioned at a root end of the blade to sense stress due to a flap bending moment of the blade, i.e., a moment that causes the blade to deflect in a direction normal to the plane of the rotor 130. Although the wind turbine 100 is depicted as having only one bending moment sensor 142 on each blade 140, multiple bending moment sensors 142 may be included on each blade at various positions, e.g., at 20%, 40%, 50%, 60%, 75% and 80% of the blade radius from the blade root. Moreover, at least some of the multiple bending moment sensors 142 (or, alternatively, at least one additional bending moment sensor) may be positioned to measure an edge bending moment, i.e., a moment that causes the blade to deflect in a direction substantially within the plane of the rotor 130. Alternatively, only a single one of the blades 140 may be equipped with one or more bending moment sensors 142.

Furthermore, in addition to positioning one or more bending moment sensors 142 on or within each blade 140, one or more additional sensors may be used to control or log data about operation of the WTG 100 or its operating environment. For example, the WTG 100 may include a sensor at the back of the nacelle 120 in the form of an accelerometer. The accelerometer may be mounted in such a way that the accelerometer detects horizontal or substantially horizontal oscillations of the nacelle, which may result from edgewise oscillations of the blades.

The WTG 100 may also include a climate condition sensor system 150 that includes sensors, such as a wind speed sensor, a wind direction sensor, a temperature sensor, and/or a barometric pressure sensor. The climate condition sensor system 150 may also be considered to include at least some of the afore-mentioned sensors, such as the bending moment sensors 142, to the extent that such sensors can be used to detect climate conditions, such as wind speed and direction. Furthermore, it should be noted that signals produced by the sensors of the climate condition sensor system 150, and any other sensor signals of the WTG, may be filtered, e.g., by a low pass filter, high pass filter, band pass filter, and/or band stop filter prior to use.

Located in the nacelle 120 are one or more controllers 160 used to control various aspects of the WTG 100. For example, the one or more controllers 160 receive data from the various sensors and controls aspects such as rotor speed, blade pitch angle, power output level, etc. Moreover, the one or more controllers 160 may include or have access to one or more memory devices in which are stored reference data, such as look-up-tables, climate and wind park model data, and the like. At least some of the one or more controllers 160 may also be located outside of the nacelle 120, such as in the tower 110 or in another structure near the WTG 100. The one or more controllers 160 may be implemented using circuitry that includes hardware, software encoded on computer-readable media including programmable and non-programmable media, or any combination of the foregoing.

Figure 2:
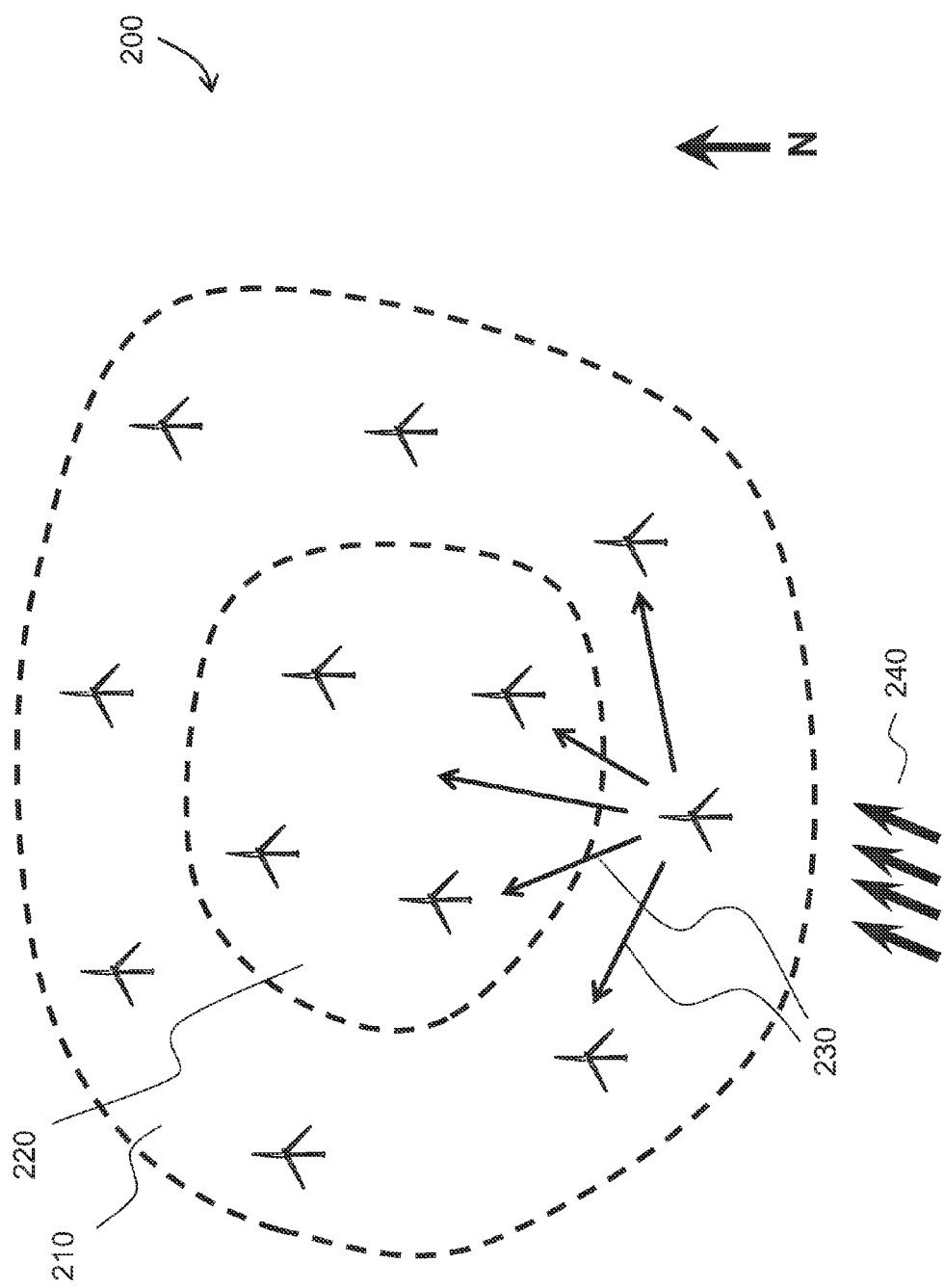
FIG. 2 shows an example wind park including several instances of the WTG of FIG. 1.

FIG. 2 shows a wind park 200 that includes various instances of the WTG 100 of FIG. 1. The wind park 200 may be composed of a set of outer WTGs 210 and a set of inner WTGs 220 that are functionally equivalent to the outer WTGs 210 except that, during operation, the outer WTGs 210 are adaptively selected (or de-selected) to operate as front line turbines. Moreover, the outer WTGs 210 may be limited to those WTGs that are located within an outer annular region of the wind park or a portion thereof. A width of the annular region maybe determined by a siting engineer based on how quickly a worst case scenario wind event might travel and how quickly each WTG in the wind park could adequately react to an extreme wind event warning.

When selected to operate as front line WTGs, the outer WTGs 210 operate defensively as a precaution against extreme wind events, detect extreme wind events, and warn the inner WTGs 220 and any un-selected outer WTGs 210 of detected extreme wind events so that the WTGs can timely switch to operating defensively. For example, warnings 230 are sent from one or more of the front line WTGs when the one or more front line turbines detect a wind gust 240. Thus, the controller 160 of each of the outer WTGs 210 is configured to cause the WTG to begin operating defensively in dependence on the measured wind direction or, regardless of the measured wind direction, if an indication is received from another WTG in the wind park of an approaching extreme wind event.

An "extreme wind event," as this phrase or similar phrases are used herein, is understood to include, by way of example and not limitation, a wind gust, whether coherent or non-coherent, an extreme drop in wind velocity, an extreme directional change in wind, an extreme change in wind shear, extreme wind turbulence, or any combination thereof. Furthermore, "defensive operation" of a WTG, or similar terminology as used herein, is understood to mean operation of the WTG in a conservative way to reduce the likelihood of damage from an extreme wind event. Thus, operating a WTG defensively may include reducing a rotational speed reference for a rotor speed control algorithm, increasing a minimum pitch angle for a blade pitch control algorithm, and/or decreasing a power reference for a power level control algorithm. Reducing the rotational speed reference and/or increasing the minimum pitch angle reduces the likelihood of damage due to an extreme wind event because both actions lead to decreased loading due to a changed angle of attack. Thus, for example, a sudden gust will not cause the rotor speed or blade loading to exceed design limitations. Furthermore, decreasing the power reference reduces the likelihood of damage by creating a margin of error below the WTG's rated power into which the WTG can cross without undue risk of damage in the event of an extreme wind event. In addition, defensive operation may differ for partial load operation than for full load operation. For example, when operating under partial load, the WTG may operate defensively by increasing the minimum pitch angle and decreasing the rotational speed reference and, when operating under full load, the WTG may operate defensively by decreasing the rotational speed reference and decreasing the power reference.

Figure 3:
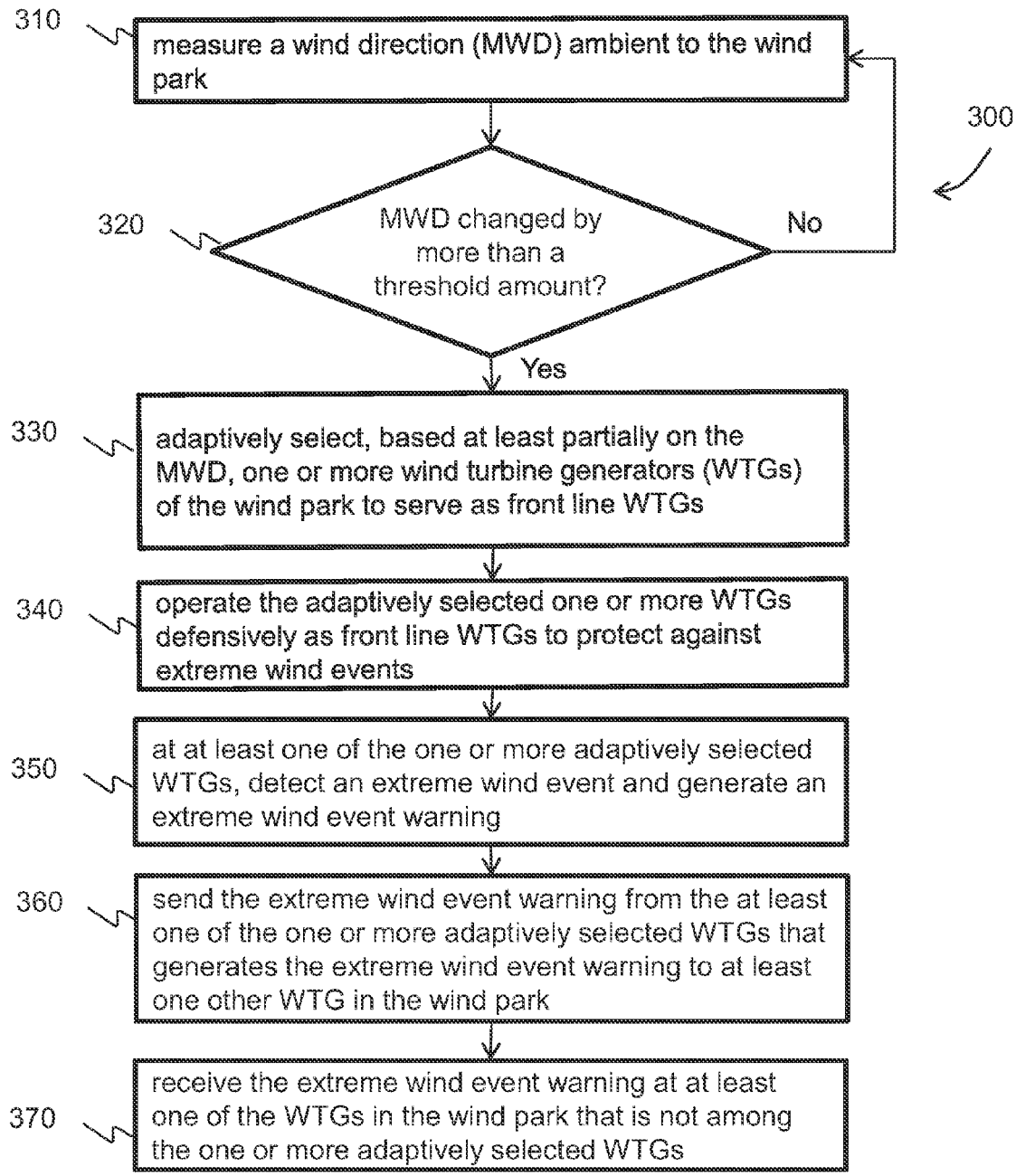
FIG. 3 shows a flow diagram representing an example method for warning a WTG in a wind park, such as the wind park of FIG. 2, of an extreme wind event.

FIG. 3 shows an example method 300 for warning one or more WTGs 100 in the wind park 200 of an extreme wind event. The method 300 includes a first stage 310 in which climate conditions are measured to obtain a measured wind direction (MWD) of wind ambient to the wind park 200. The wind direction may be measured, e.g., by an anemometer. In addition, or alternatively, a measurement of wind direction may be derived from blade bending moment sensors. At the next stage 320, the method 300 compares the current MWD to one or more previous measurements of wind direction to determine whether the current MWD has changed by more than a threshold amount. Because wind direction can often change directions temporarily for short moments, the MWD may be processed, e.g. by a low pass filter and/or a running average function, prior to the comparison. If the MWD has not changed by more than the threshold amount the method 300 returns to stage 310 to continue measuring wind direction. If, on the other hand, the MWD has changed by more than the threshold amount, the method 300 proceeds to stage 330, at which point one or more WTGs 100 of the wind park 200 are adaptively selected, based at least partially on the MWD, to serve as front line WTGs. Thus, the selection of front line turbines will change only when the MWD changes by a significant amount.

Because many types of extreme wind events are likely to propagate in the same direction as the measured wind direction, the selection of front line WTGs is based at least partially on the MWD. For example, the outer WTGs 210 that are furthest upwind may be selected to serve as front line WTGs. Additional criteria, such as a climate model and/or terrain model may be considered in the selection of front line WTGs. Moreover, to account for the possibility of a sudden directional change or local extreme wind events, outer WTGs 210 other than those that are furthest upwind may be selected to serve as front line WTGs.

The pool of WTGs from which front line WTGs are selected may be limited to the outer WTGs 210. However, if one or more of the outer WTGs 210 is inoperable or otherwise incapable of performing front line operations adequately, the pool may be expanded to include one or more inner WTGs 220. Moreover, the threshold MWD change amount may be determined by a wind park siting engineer based on design parameters, such as, a desired sensitivity to wind direction changes, and/or an expected level of wind direction variability predicted by a model of ambient climate and/or surrounding terrain.

As shown at stage 340, the WTGs that are adaptively selected in stage 330 operate defensively as front line WTGs to protect against extreme wind events. Moreover, each of the front line WTGs monitors for extreme wind events and generates a warning if an extreme wind event is detected. For instance, at stage 350 an extreme wind event is detected at at least one of the front line WTGs and a warning is generated. Then, at stage 360, the extreme wind event warning is sent to at least one other WTG in the wind park. For example, the warning may be sent to all WTGs in the wind park not operating as front line WTGs. The WTGs not selected to operate as front line WTGs may operate normally or at an improved level of performance beyond a rated design level (i.e., overrated), thereby making efficient use of their protected status.

At stage 370, the warning is received at at least one of the non-front line WTGs. The warning may be received directly from the front line WTG that generated the warning or indirectly from another WTG or from a central controller that receives the warning directly or indirectly from the front line WTG that generated the warning. A warned WTG may then determine what action to take in response to the warning. If, for example, the warned WTG is already operating defensively for another reason, the warned WTG may not change its operation. Alternatively, the warned WTG may implement a shut-down procedure in response to receipt of the warning. Moreover, the warning may include information about the severity of the extreme wind event, such as wind speed, and the warned WTG may take different prophylactic measures depending on the severity.

Detection of extreme wind events, such as a wind gust or extreme drop may include, e.g., detecting a sudden change in anemometer measurements, blade loading or bending moment measurements, and/or nacelle acceleration measurements. In addition, a wind speed estimate may be used to detect a wind gust or extreme drop. A wind speed estimate may be measured by an anemometer or derived, for example, based on measured (or reference) grid power, measured (or reference) rotational speed, measured (or reference) pitch angles, and/or the Cp-table for the rotor.

Other types of extreme wind events may also be detected, such as directional changes accompanied by a coherent gust, wind shear events, and local wind speed events in a rotor plane. For example, a directional change accompanied by a coherent gust may be detected by evaluating measurements from a wind direction (yaw error) sensor and, at the same time, evaluating measurements from an anemometer. Detecting directional change accompanied by a coherent gust may also be performed by separating out a tilt component from blade load measurements and detecting a sudden change in the tilt component. Detection of wind shear events may also include evaluating sudden changes in the tilt component. In addition, or alternatively, detection of wind shear events may include detection of a sudden change in the tilt component of a nacelle accelerometer measurement.

Individual blade load measurements may also be evaluated to detect local wind events in the rotor plane. It should be noted that the above extreme wind event detection methods aim at detecting a specific wind event or condition using different sensors and processing of sensor data. Alternatively, an excessively high load measured on a structural part of the WTG may also be taken as an indication of an extreme wind event. For example, an extreme wind event is likely if a single blade load measurement exceeds a predetermined threshold, if tilt and/or yaw derived values exceed a predetermined threshold, a tower strain (e.g., as measured by one or more strain gauges on the tower of the WTG), exceeds a predetermined threshold, or a tower acceleration (e.g., as measured by an accelerometer on top of the tower) exceeds a predetermined threshold.

Figure 4:
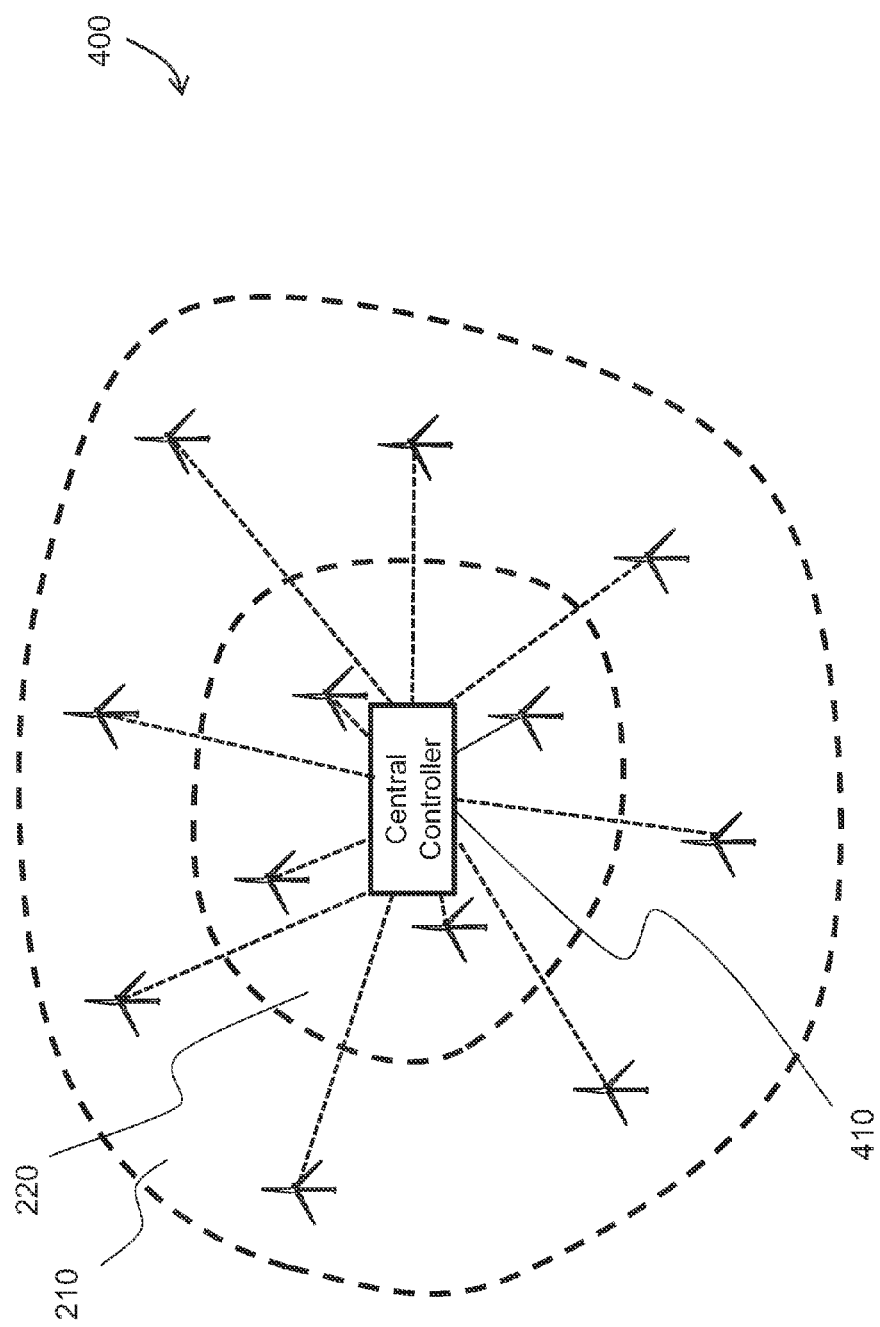
FIG. 4 shows another example wind park that includes a central controller.

FIG. 4 shows a wind park 400 similar to the wind park 200 of FIG. 2 but includes a central controller 410. The central controller 410 may be a single controller or a group of controllers communicatively coupled. The central controller 410 controls various aspects of the WTGs 100 in the wind park 400 including, for example, one or more characteristics of power produced by each WTG 100. The central controller 410 may receive data from the grid and/or various sensors in the wind park 400 and/or from an electric grid to perform its control operations. Moreover, the controller 410 may include or have access to one or more memory devices in which are stored reference data, such as look-up-tables, climate and wind park model data, and the like. The controller 410 may be located inside the nacelle of one of the WTGs 100 or in a separate structure in the wind park 400 and may be implemented using circuitry that includes hardware, software encoded on computer-readable media including programmable and non-programmable media, or any combination of the foregoing.

Figure 5:
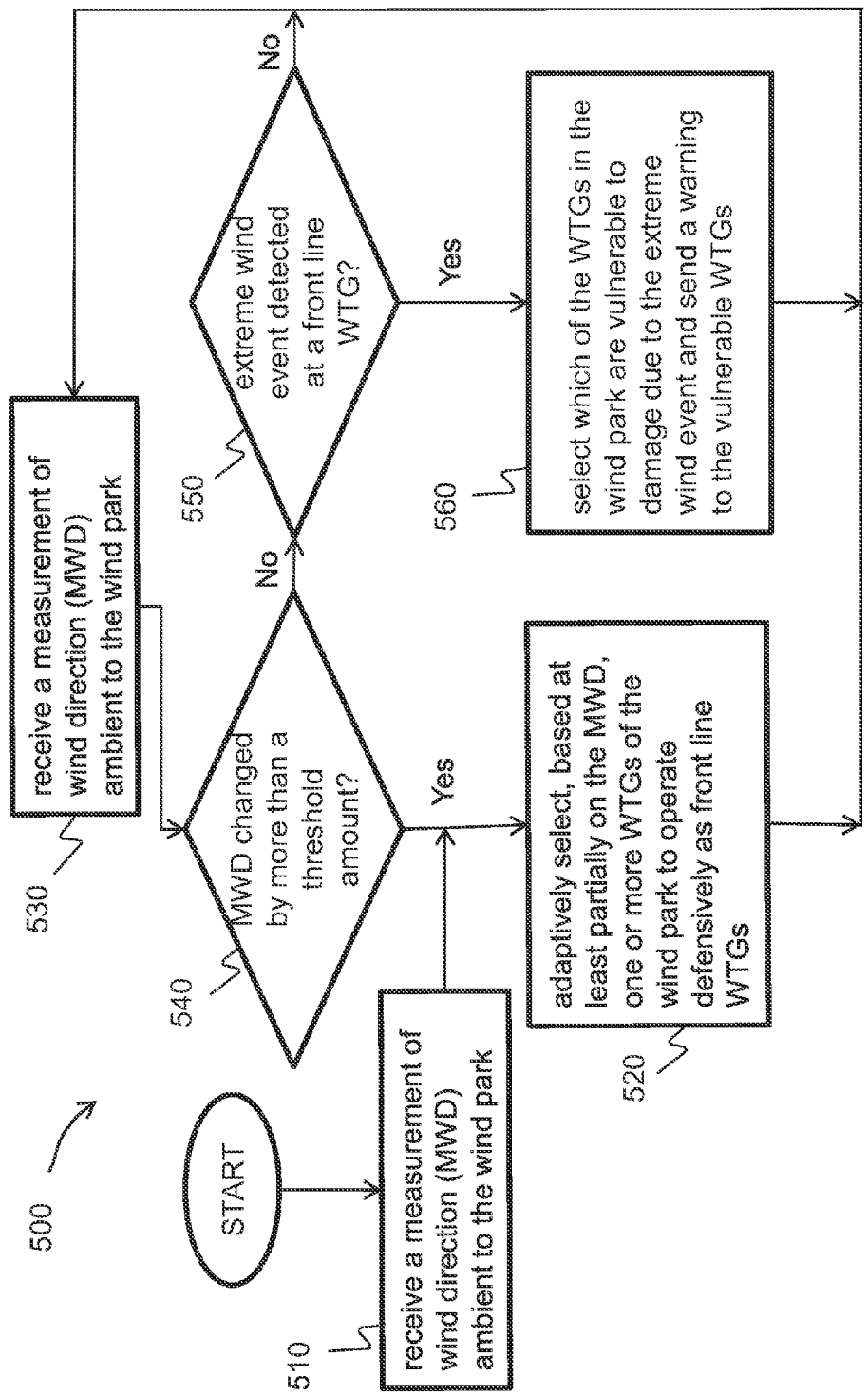
FIG. 5 shows a flow diagram representing an example method for warning a WTG in a wind park of an extreme wind event using the central controller.

One or more stages of the method 300 (or portions of one or more stages) may be performed by the controllers 160 of each individual WTG 100 and/or by the central controller 410. For example, FIG. 5 shows an example method 500 for warning one or more WTGs 100 of the wind park 400 of an extreme wind event in which the selection of front line turbines is made by the central controller 410. At stage 510, the central controller 410 receives at least one measurement of wind direction (MWD) of wind ambient to the wind park. The MWD may be received from a single WTG in the wind park 400. Alternatively, the central controller 410 may receive multiple measurements of wind direction over time and/or from multiple WTGs and may combine the measurements, e.g., by an averaging operation, to produce a single MWD value.

Next, at stage 520, the central controller 410 adaptively selects, based at least partially on the MWD, which of the WTGs 100 should serve as front line WTGs. The method 500 then continues on to stage 530 where wind direction measurements are again received. If, at stage 540, the MWD changes by more than threshold amount, the selection process is performed again at stage 520 to account for this change. However, if the MWD remains relatively unchanged, the central controller 410 determines, at stage 550, if an extreme wind event has been detected at any of the front line WTGs. If no extreme wind event has been detected, the central controller 410 returns to monitoring wind direction and adapting the selection of front line WTGs at stages 530, 540, and 520. If, however, an extreme wind event has been detected, the method proceeds to stage 560 and the central controller 410 selects which WTGs in the wind park are vulnerable to damage due to the extreme wind event and sends a warning to those WTGs. Alternatively, the central controller 410 sends a warning to all WTGs in the wind park, or at least to all WTGs outside the group of front line WTGs, and each warned WTG determines how to respond.

Figure 6:
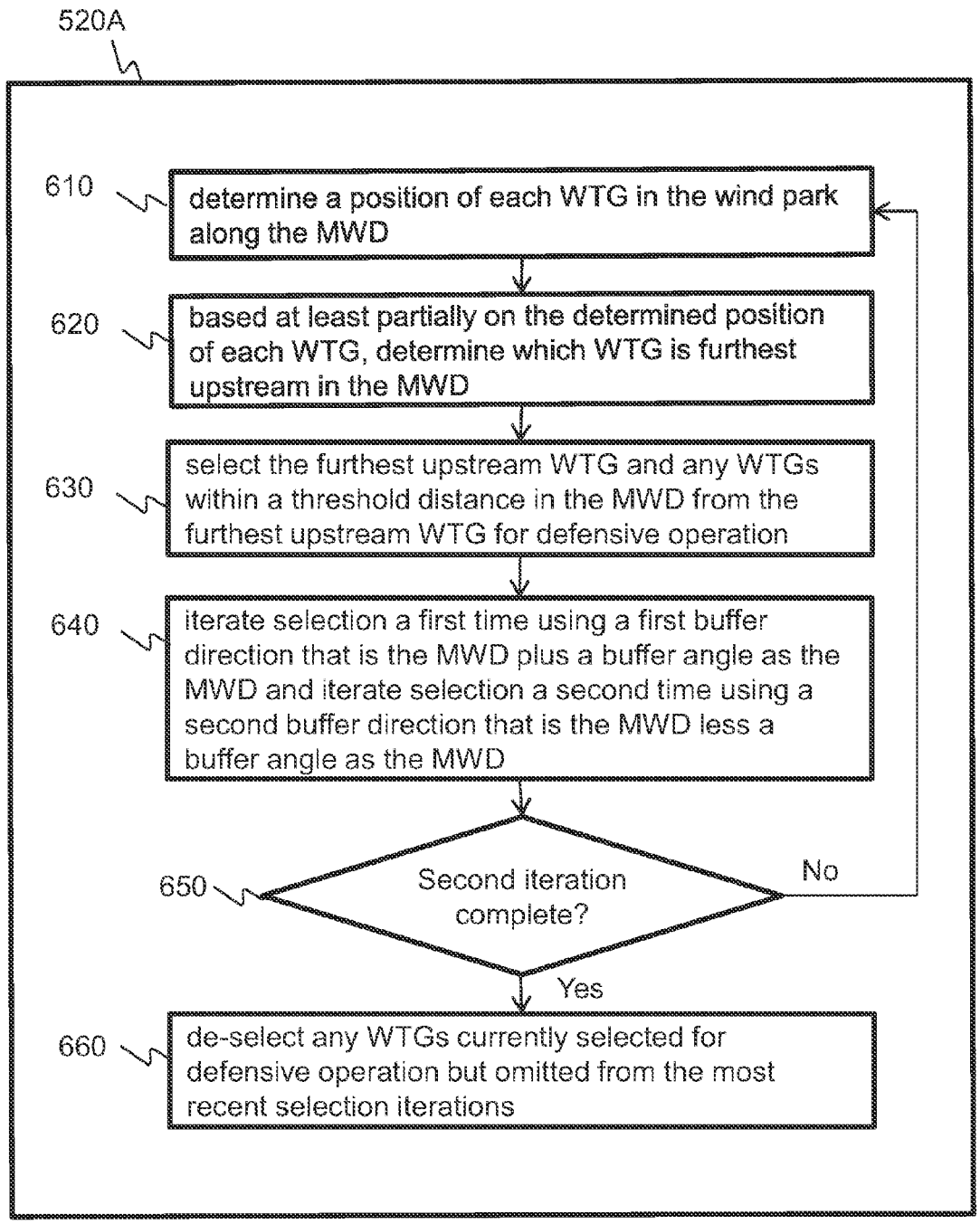
FIG. 6 shows a flow diagram representing an example method for carrying out an adaptive front line WTG selection stage of the method of FIG. 5.
Figure 7:
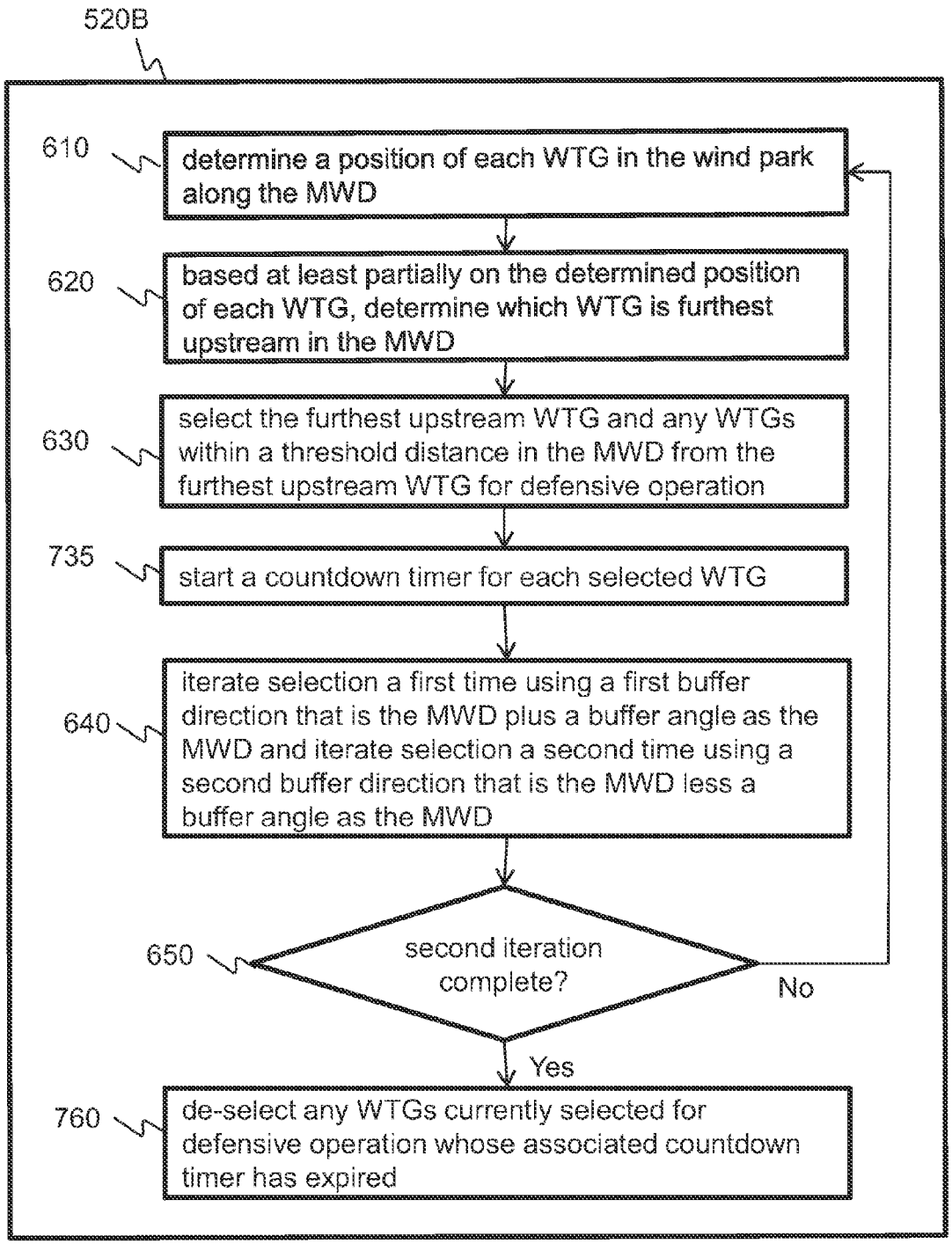
FIG. 7 shows a flow diagram representing another example method for carrying out the adaptive front line WTG selection stage of the method of FIG. 5.

The selection of front line WTGs at stage 520 may be implemented in various ways. Views of two alternative example methods for carrying out stage 520 are shown in FIG. 6 and FIG. 7, respectively. FIG. 6 shows a first method 520A for carrying out stage 520 in which front line WTGs are selected based at least on the MWD. First, at stage 610, the central controller 410 determines a position of each WTG in the wind park along the MWD. At stage 620, the central controller 410 determines which WTG is furthest upstream in the MWD based at least partially on the determined position of each WTG. Determining which WTG is furthest upstream in the MWD, facilitates identification of which WTGs an extreme wind event is likely to reach first and the central controller 410 can then select those WTGs as front line WTGs. For example, at stage 630, the central controller 410 selects the furthest upstream WTG for defensive operation, as well as any WTGs within a threshold distance in the MWD from the furthest upstream WTG for defensive operation. The threshold distance may be a predetermined or adaptive threshold that is large enough to accommodate a worst case scenario. For example, the threshold distance may be a predetermined value based on the maximum expected travel speed of extreme wind events and a maximum reaction time needed by a WTG to take precaution against damage from the extreme wind event. Such worst case scenario data may be determined through simulation and/or empirical testing and the threshold distance may be derived from this data.

At stages 640 and 650, the selection process carried out by stages 610 through 630 is iterated twice for first and second buffer directions. For the first iteration, the MWD used for the selection process is the MWD plus a buffer angle, such as 15 degrees. For the second iteration, the MWD used for the selection process is the MWD less the buffer angle. By iterating the selection process in this manner, the selection of front line WTGs is expanded to cover a wider front by including WTGs peripheral to the furthest upstream WTG. Thus, the wind park will be protected against extreme wind events that come from the MWD and directions near the MWD. For very large wind parks, the buffer angle may be increased relative to that used for smaller wind parks, and/or additional iterations for corresponding additional buffer angles (e.g., 10 degrees, 15 degrees, 20 degrees, etc.) may be included in the method 520A. Moreover, for relatively small wind parks (e.g., three to about twenty WTGs) and depending on how sparsely the WTGs are located relative to one another, the buffer angle iterations of stages 640 and 650 may be omitted from the method 520A.

At stage 660, the central controller 410 de-selects any WTGs currently selected for defensive operation but omitted from the most recent round of selection iterations (i.e., the selection iteration made for the most recent MWD, the selection iteration for the MWD plus the buffer angle, and the selection iteration for the MWD less the buffer angle). Accordingly, WTGs that were previously designated to operate defensively but no longer need to given the current MWD (e.g., turbines previously located upstream but now located downstream) may improve their performance level and thereby produce more power than if they were continuously operated defensively.

A second method 520B for selecting front line WTGs is shown in FIG. 7. The method 520B differs from the method 520A in FIG. 6 in that the central controller 410 uses a countdown timer associated with selected front line WTGs at stage 760 to determine when front line WTGs should be de-selected. More specifically, the method 520B includes a stage 735 after stage 630 in which the countdown timer is started for the WTGs selected by execution of stage 630. In one embodiment, a different countdown timer is uniquely associated with each selected WTG. Accordingly, if a first WTG is selected in a first round of selection iterations and not selected in a second round of selection iterations, the first WTG may still operate defensively if the countdown timer associated with it has not expired. Thus, the selection of front line WTGs has a form of hysteresis and, accordingly, the selection of front line WTGs will not only depend on a current MWD but also on recent MWDs. The amount of time after which the countdown timer expires may be a predetermined amount, ranging anywhere from about 10 minutes to about 20 minutes, for example.

Figure 8:
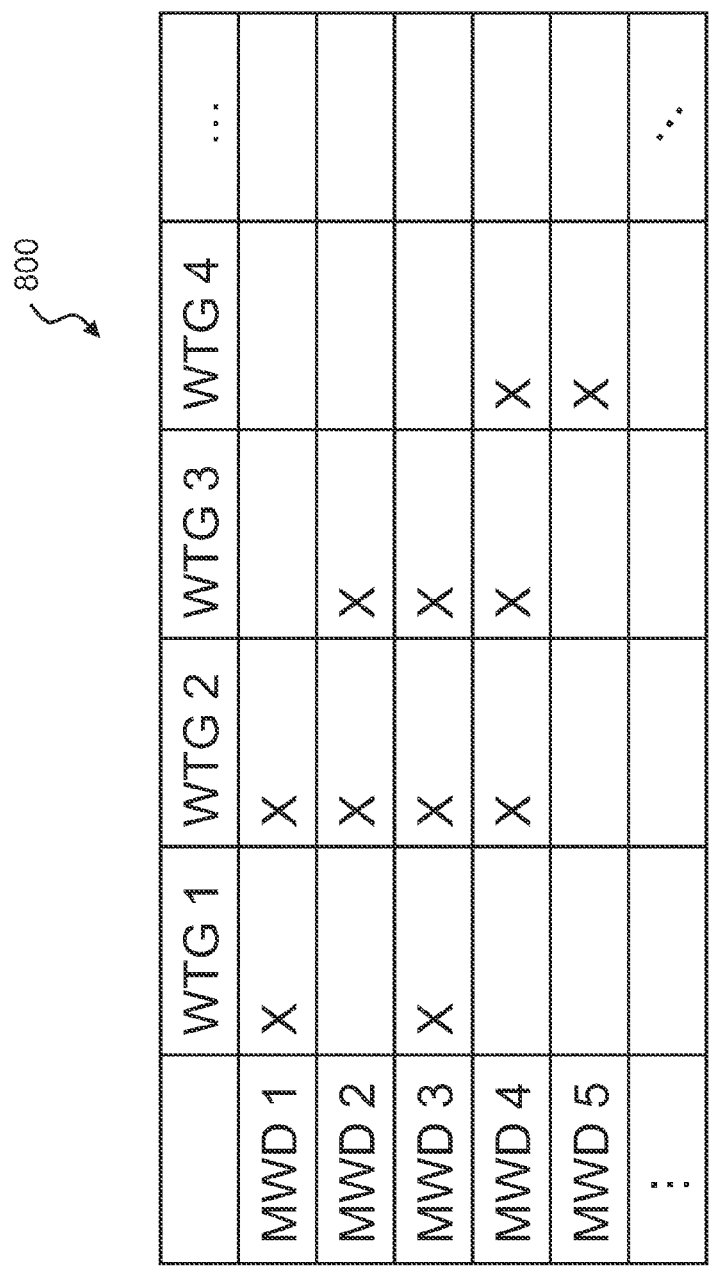
FIG. 8 shows an example front line WTG selection table that may be referenced by a controller that adaptively selects front line WTGs in a wind park to warn other WTGs of the wind park of extreme wind events.

In another embodiment, front line WTG selection may be implemented using a look up table populated with entries by a wind park siting engineer. FIG. 8 shows an example front line WTG selection look up table 800 that designates which of the outer WTGs 210 (listed along the top row of the table) should operate defensively as front line WTGs for each of a plurality of MWDs (listed along the left column of the table). Each cell of the table 800 may include a computer-readable indication (shown in the table as an "X") as to whether a given WTG should operate defensively for a given MWD. The table may be stored in a memory device accessible to the central controller 410. Thus, the central controller 410 may receive measurements of wind direction from time to time, look up in the table 800 which WTGs in the wind park should be operated defensively as front line WTGs based on the MWD, and send the appropriate commands to such WTGs to implement front line protection for the wind park. Alternatively, each of the controllers 160 of each outer WTG 210 may measure the wind direction and may have access to the look up table 800 (or a local copy of the look up table) to determine whether the corresponding outer WTG 210 should operate defensively based on the MWD.

The entries of the table 800 may be populated manually by a siting engineer based, e.g., on careful study of the climate and terrain. Alternatively or in addition, any of the foregoing methods 500 and 900 or variations thereof may be carried out in a simulation environment to assist the engineer in determining how to populate the table 800.

Any one of outer WTGs 210 may at times fail or be unable to serve as a front line WTG. Therefore, in addition to using the look up table 800, one or more contingency look up tables that designate one or more inner WTGs 220 as front line WTGs for certain wind directions may also be prepared for use if needed. Alternatively, the controller 160 of each WTG may be configured to use the look up table 800 by default but override the look up table 800 if necessary due to, e.g., a failure in an outer WTG 210. To facilitate detection of whether the look up table 800 should be overridden, each WTG may track its status as either protected—if operating defensively or downstream from a protected WTG—or un-protected—if unable to operate defensively or detect extreme wind events. Moreover, the status of each of a WTG's neighboring WTGs may be accessible to each WTG by, e.g., a central database or a peer-to-peer communications network between the WTGs. Thus, if a WTG detects or receives an indication that an upstream WTG designated by the table 800 as a front line WTG is actually un-protected, the downstream WTG may override the table 800 and operate as a front line WTG, thereby filling a gap in the front line protection that would otherwise exist.

Figure 9:
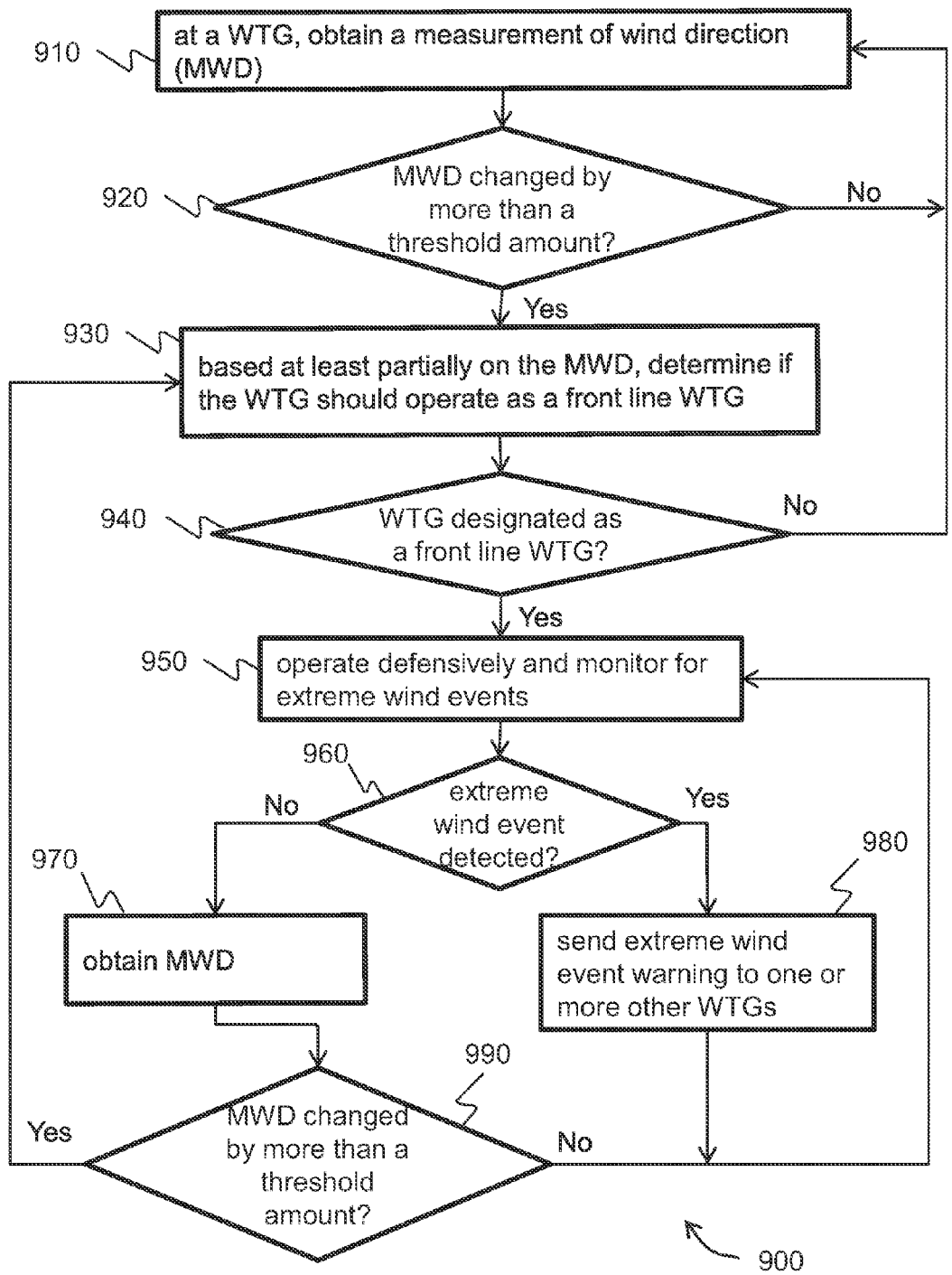
FIG. 9 shows a flow diagram representing an example de-centralized method for warning a WTG in a wind park of an extreme wind event.

The use of the look up table 800 by each of the controllers 160 of each WTG is an example of a de-centralized method of providing protection against extreme wind events. FIG. 9 shows another de-centralized method 900 that the controllers 160 of each WTG 100 of the wind park 200 may carry out to provide front line protection to the wind park 200 as a whole. The method 900 may also be implemented in a wind park having a central controller, such as the wind park 400, since the central controller may be used for purposes other than front line protection. Moreover, because the controller of each WTG of the wind park implements the method 900 in parallel with the other WTG controllers, the following description of how the method 900 is implemented in one WTG controller will suffice to describe how it would be implemented by other controllers.

At stage 910 of the method 900, the controller 160 of a WTG 100 obtains a measurement of wind direction (MWD) either directly or indirectly, e.g., from another WTG. Then, at stage 920, the controller 160 determines whether the MWD has changed by more than a threshold amount. This stage may be carried out similar to the stage 320 described above with reference to FIG. 3 and if the MWD does not change enough stages 910 and 920 are repeated. If the MWD has changed significantly enough, the method 900 proceeds to stage 930 where the controller 160 determines if the WTG should operate as a front line WTG based at least partially on the MWD. If, at the subsequent stage 940, the controller 160 determines that the WTG need not operate as a front line WTG (e.g., due to the presence of another front line WTG upstream), the method returns to stage 910 to continue monitoring the wind direction. The stages 910 through 940 are repeated until it is determined that the WTG should designate itself to operate as a front line WTG at stage 930 and the method 900 proceeds to stage 950.

At stage 950, the WTG operates defensively and monitors for extreme wind events using, e.g., the climate condition sensor system 150. If an extreme wind event is not detected (stage 960) a direction of wind is measured anew (stage 970) and if the direction has not changed by more than the threshold amount (stage 990), the WTG continues to operate defensively and monitor for extreme wind events (stage 950). If, however, an extreme wind event is detected (stage 960), the WTG sends, at stage 980, a warning to one or more other WTGs in the wind park. For example, the WTG may send the warning to all neighboring WTGs or at least all downstream neighboring WTGs, which may in turn send the warning to their neighboring WTGs until the warning has propagated through the wind park. Alternatively, the warning may be sent to the central controller 410 and then to one or more other WTGs via the central controller 410. If no extreme wind event is detected, however, and at stage 990 the MWD is determined to be greater than the threshold amount, the method 900 returns to stage 930 to determine if the WTG should remain operating as a front line WTG.

Figure 10:
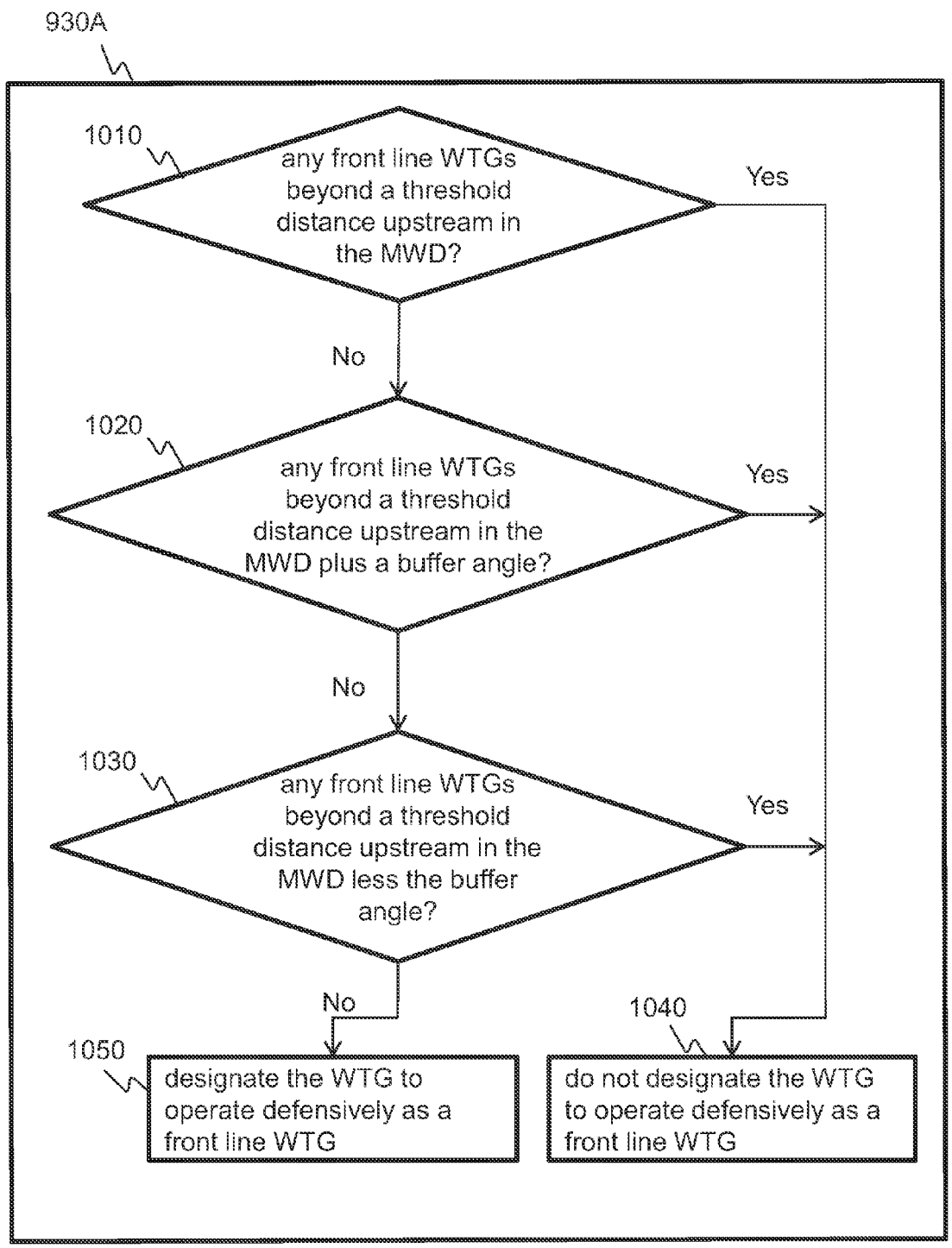
FIG. 10 shows a flow diagram representing an example method for carrying out an adaptive front line WTG selection stage of the method of FIG. 9.
Figure 11:
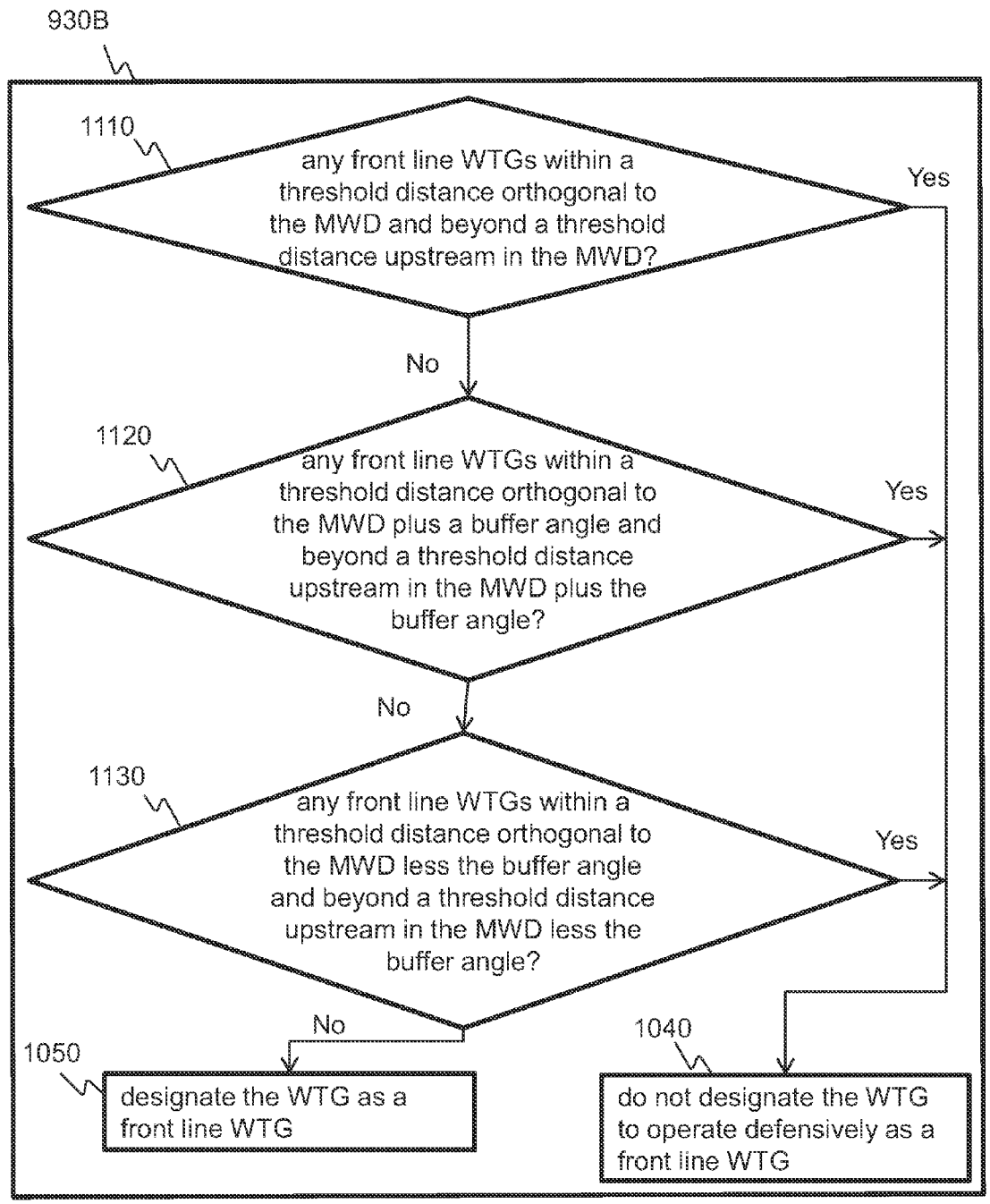
FIG. 11 shows a flow diagram representing another example method for carrying out an adaptive front line WTG selection stage of the method of FIG. 9.

The determination at stage 930 of whether the WTG 100 should operate as a front line WTG may be made according to various methods. FIGS. 10 and 11 show just two example methods 930A and 930B for determining whether to operate as a front line WTG at stage 930. In the first alternative method 930A, the controller 160 determines whether any WTGs beyond a threshold distance upstream in the MWD are front line WTGs (stage 1010). The controller 160 also makes this determination for the MWD plus a buffer angle and less the buffer angle. If no front line WTG is detected in the MWD or within a sector spanned by the buffer angle, the controller 160 proceeds to stage 1050 and designates the WTG to operate defensively as a front line WTG. Otherwise, the method 930A proceeds to stage 1040 and the WTG does not designate itself to operate defensively as a front line WTG. Moreover, to facilitate detection of front line WTGs, each WTG designated to operate as a front line WTG may communicate its status as a front line WTG to other WTGs either directly or via a central database accessible to other WTGs in the wind park.

As an alternative to method 930A in FIG. 10, FIG. 11 shows a method 930B, which differs from the method 930A in that an extreme wind event is not assumed to extend across the entire wind park. Thus, the method 930B may be appropriate for relatively large wind parks. More specifically, stage 1110 is similar to corresponding stage 1010 of the method 930A but also ensures that if any front line WTG is detected upstream in the MWD it is within a threshold distance in a direction orthogonal to the MWD. Thus, the WTG will not rely on a front line WTG for protection from extreme wind events if the front line WTG is too far away in a direction orthogonal to the MWD. The stages 1120 and 1130 of the method 930B correspond to the stages 1020 and 1030 of the method 930A in a similar manner.

Moreover, in one embodiment, one or both of the methods 930A and 930B may be altered to include a countdown timer stage as a means of implementing some hysteresis or memory in the selection of front line WTGs. More specifically, when, at stage 1050, the WTG is designated to operate as a front line WTG, the controller 160 may start a countdown timer that ranges from, e.g., about 10 to about 20 minutes. In addition, a stage may be included before stage 1010 (and/or stage 1110) to determine whether the countdown timer has expired. If the countdown timer has expired, the controller proceeds to stage 1050, otherwise the controller 160 proceeds to stage 1010 (or stage 1110, as the case may be).

Figure 12:
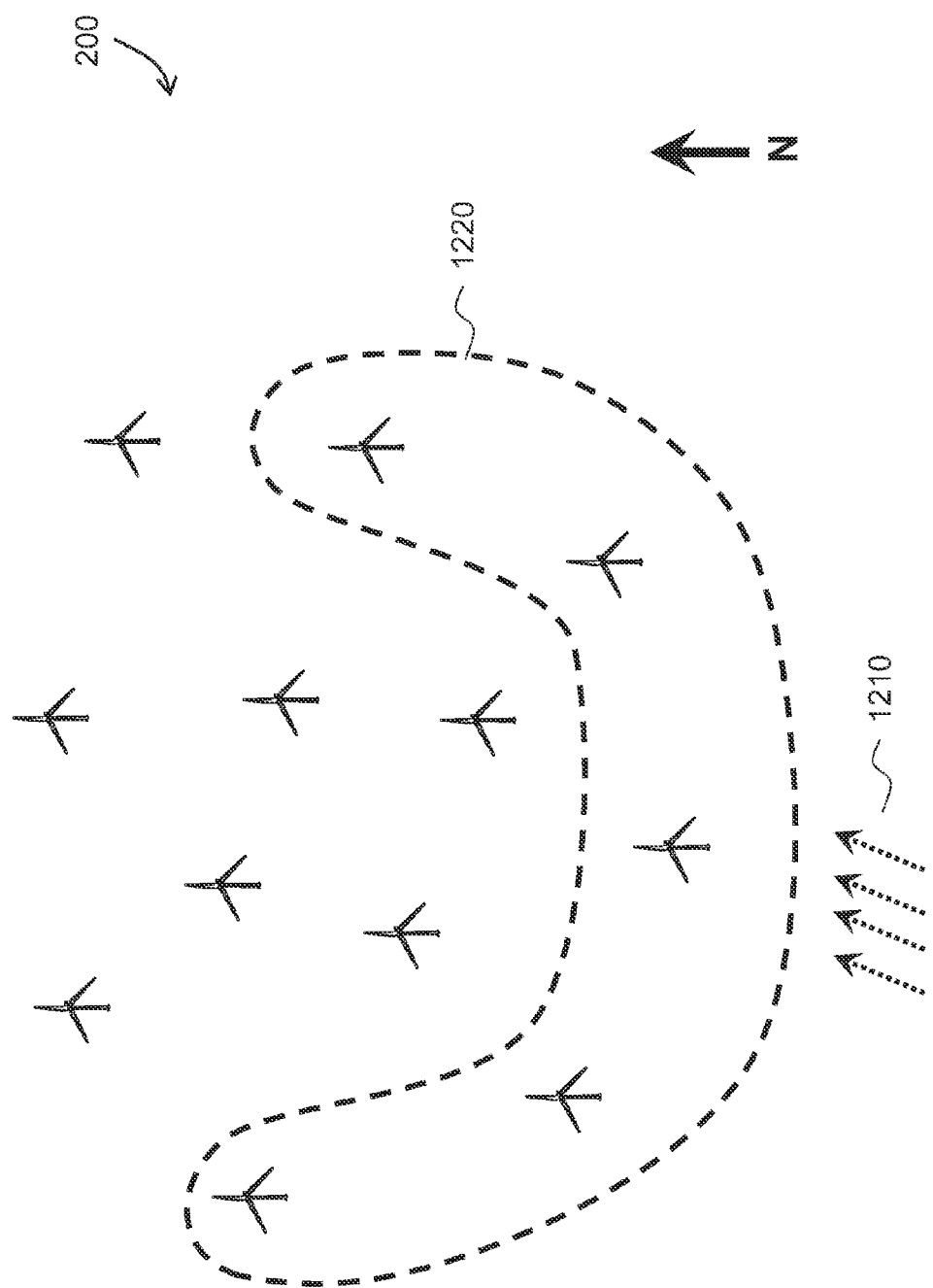
FIG. 12 shows the wind park of FIG. 2 and depicts an example selection of which front line WTGs in the wind park might be selected to operate as front line WTGs.
Figure 13:
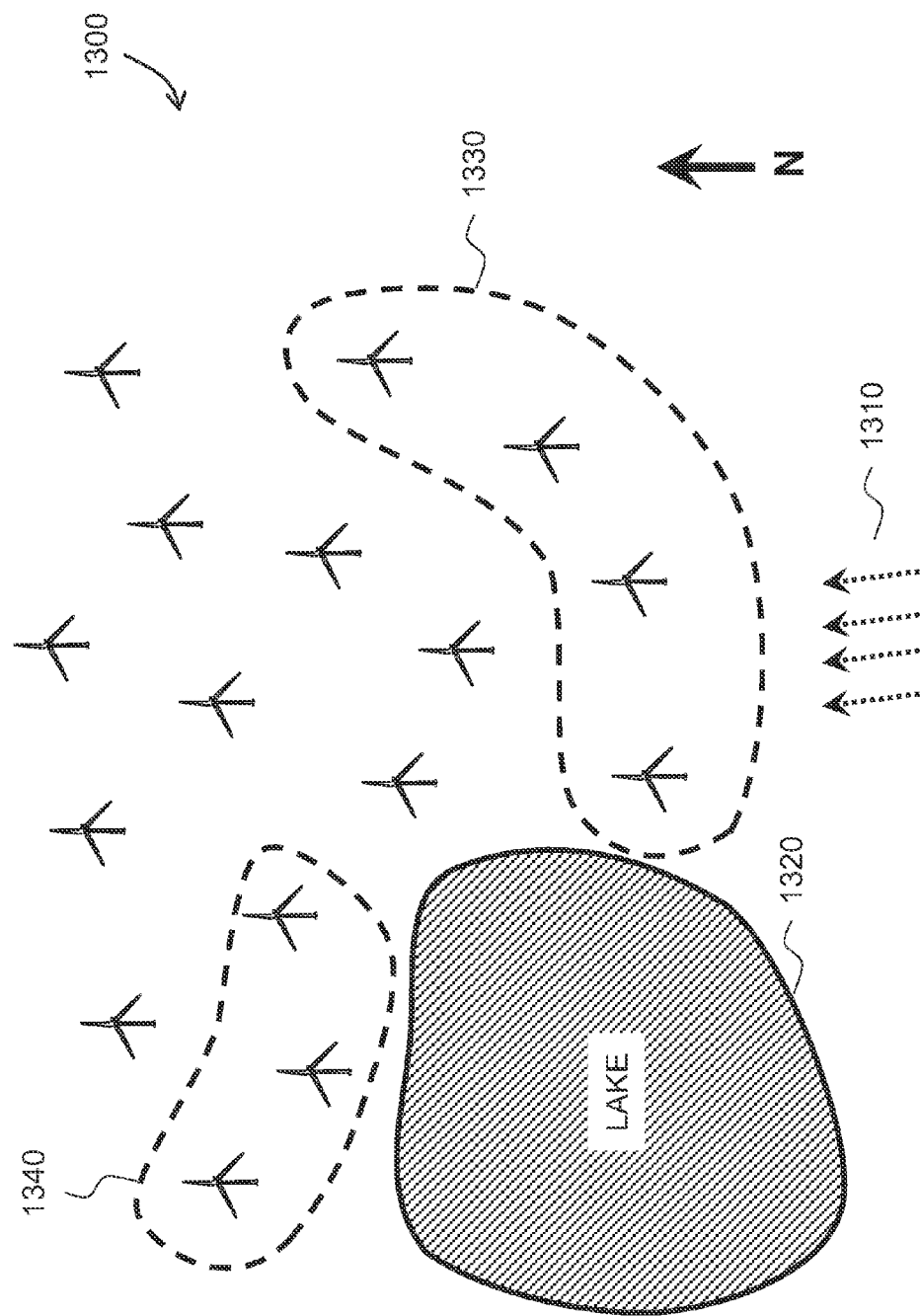
FIG. 13 shows another wind park and depicts an example selection of which front line WTGs in the wind park might be selected to operate as front line WTGs.

FIGS. 12 and 13 illustrate how the selection of front line WTGs might look when an adaptive selection method, such as those described herein, is implemented in different wind parks. FIG. 12 shows the wind park 200 in which wind 1210 is measured as coming generally from the south. In such a scenario and depending on the particular design parameters used, such as threshold distances, the methods 300, 500, 900, and the methods that refer to the look up table 800 described above would likely select a group of WTGs 1220 lying along the southernmost edge and at least a portion of the easternmost and westernmost edges of the wind park 200 to serve as front line WTGs for the wind park 200.

FIG. 13 shows another wind park 1300 with a different layout of WTGs and a lake 1310. With the wind 1320 approaching from the south, the selection of front line WTGs made by the methods 300, 500, 900, and the methods that use the look up table 800 would likely include a group of WTGs 1330 that lies along the southeastern edge of the wind park 1300 and the group of WTGs 1340 that lies just north of the lake. Thus, FIG. 13 demonstrates that the WTGs selected to serve as front line WTGs may not consist of a single contiguous group of WTGs due to park terrain. Moreover, by selecting the group 1340 even though at least some of the WTGs in the group are downstream from the group 1330, the WTGs in the group 1340 and downstream therefrom are protected if a wind gust or other extreme wind event is only localized around the region north of the lake 1310. Such an extreme wind event would not be detected further upstream by the group of WTGs 1330.

Climate and/or wind park terrain models may be used in any one of the foregoing methods 300, 500, 900, or in methods using the look up table 800 to inform the selection of front line WTGs. For example, wind conditions may be observed over a long time (e.g., multiple years) to create a climate model, which may indicate that wind events appear relatively frequently in a certain direction during a certain time of year. Based on this information, the controller performing the selection of front line WTGs may be programmed or otherwise configured to designate WTGs on a side of the wind park facing the direction of concern as front line WTGs before or instead of carrying out any front line WTG selection stages. This preemptive selection by the controller may be restricted to occur only during the relevant time of year or when certain predetermined climate conditions are detected. If implementing the selection using the table 800, the controller may be provided with different look up tables for different times of the year or when certain predetermined climate conditions are detected. Climate model data may also affect threshold distances used in the selection process to widen or narrow a width of the front line of defensive created by the front line WTGs during certain times of year and/or under certain climate conditions.

With reference again to the wind park 200 of FIG. 2, the inner WTGs 220 are assumed to be similar to the outer WTGs 210 in terms of rated performance and structure. In one embodiment, however, the outer WTGs 210 may be a different type of WTG than the inner WTGs 220. For example, the outer WTGs 210 may a lower power rating, a smaller rotor diameter, a higher rotor bearing strength, and/or a higher blade strength than the inner WTGs 220. Conversely, the inner WTGs 220 may have a higher power rating, a larger rotor diameter, a lower rotor bearing strength, and/or a lower blade strength than the outer WTGs 210. Furthermore, in the foregoing embodiments the front line WTGs are adaptively selected based on MWD. However, in embodiments in which the inner WTGs 220 differ from the outer WTGs 210, the group of front line WTGs may be predetermined, e.g., by a wind park siting engineer. For example, the entire set of outer front line WTGs 210 may be pre-selected for operation as front line WTGs.

Example methods and systems described herein may be used to warn WTGs of extreme wind events and reduce the likelihood of damage due to extreme wind events. Certain methods include selecting a group of front line WTGs in a wind park to operate defensively, the selection depending at least in part on a measured wind direction, and operating the front line WTGs defensively. Moreover, in certain methods, the front line WTGs detect extreme wind events and warn other WTGs in the wind park when the detected extreme wind events occur so that the warned WTGs may switch to defensive operation. In this manner, only certain, strategically selected WTGs in a wind park are required to operate defensively during the majority of the time and, accordingly, energy production efficiency is increased overall.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

What is claimed is:

1. A method, comprising:
    measuring, using at least one sensor, a wind direction relative to a wind park including a plurality of wind turbines;
    adaptively selecting, using a relationship associating predetermined ones of the plurality of wind turbines with the measured wind direction, one or more of the plurality of wind turbines to serve as front line wind turbines, wherein the relationship is independent of at least one of a prediction or a detection of an extreme wind event;
    operating the front line wind turbines in a defensive mode as a precaution against an undetected extreme wind event while operating unselected ones of the plurality of wind turbines in a non-defensive mode, wherein operating the front line wind turbines in the defensive mode includes:
        selecting a wind turbine that is likely to be first among the wind turbines of the wind park to detect an extreme wind event based on the measured wind direction as a first one of the front line wind turbines to operate defensively; and
        for each of the front line wind turbines in the wind park other than the selected wind turbine, selecting the other ones of the front line wind turbines to operate in the defensive mode based at least partially on respective distances between the other ones of the front line wind turbines and the selected first one of the front line wind turbines; and
    upon detecting the extreme wind event, changing the operation of the unselected ones of the plurality of wind turbines.

2. The method according to claim 1, further comprising:
    at at least one of the front line wind turbines, detecting the extreme wind event and generating an extreme wind event warning.

3. The method according to claim 2, further comprising:
    propagating the extreme wind event warning through the wind park from the at least one of the front line wind turbines that generates the extreme wind event warning to the unselected ones of the plurality of wind turbines in the wind park.

4. The method according to claim 2, further comprising:
    receiving the extreme wind event warning at at least one of the wind turbines in the wind park that is not among the front line wind turbines; and
    determining at each of the warned wind turbines whether to operate the warned wind turbine in a defensive mode in response to receiving the extreme wind event warning.

5. The method according to claim 2, further comprising:
    receiving the extreme wind event warning at a central wind park controller;
    selecting at the central wind park controller which of the wind turbines in the wind park are vulnerable to damage due to the extreme wind event; and
    sending the extreme wind event warning to the vulnerable ones of the wind turbines.

6. The method according to claim 1, wherein the extreme wind event is: a wind gust, an extreme drop in wind velocity, an extreme directional change in wind, an extreme change in wind shear, extreme wind turbulence, or any combination thereof.

7. The method according to claim 1, wherein each of the front line wind turbines is configured to adaptively select itself as one of the front line wind turbines and to operate in the defensive mode.

8. The method according to claim 1, wherein the wind park includes a central controller configured to adaptively select the one or more front line wind turbines to operate in the defensive mode.

9. The method according to claim 1, wherein the front line wind turbines are selected from among a group of wind turbines located within an outer annular region of the wind park.

10. The method according to claim 1, further comprising:
    overrating performance of at least one of the wind turbines in the wind park that is not among the front line wind turbines.

11. The method according to claim 1, wherein operating the front line wind turbines in the defensive mode includes at least one of:
    reducing a rotational speed reference for a rotor speed control algorithm;
    increasing a minimum pitch angle for a blade pitch control algorithm; and
    decreasing a power reference for a power level control algorithm relative to the non-defensive mode.

12. A wind park, comprising:
    an arrangement of wind turbines, the arrangement including:
        one or more first wind turbines of a first type located in an inner region of the wind park; and
        a plurality of second wind turbines of a second type located in an outer region of the wind park that at least partially surrounds the inner region,
    wherein the first type differs from the second type in at least one of the following ways: higher power rating, larger rotor diameter, lower rotor bearing strength, and lower blade strength,
    wherein various ones of the plurality of second wind turbines in the outer region are configured to be adaptively selected, using a relationship associating predetermined ones of the plurality of wind turbines with a measured wind direction, to operate in a defensive mode as a precaution against an undetected extreme wind event while the one or more first wind turbines are operated in a non-defensive-mode, wherein the relationship is independent of at least one of a prediction or a detection of an extreme wind event, wherein operating the front line wind turbines in the defensive mode includes:
  selecting a wind turbine that is likely to be first among the wind turbines of the wind park to detect an extreme wind event based on the measured wind direction as a first one of the front line wind turbines to operate defensively; and
  for each of the front line wind turbines in the wind park other than the selected wind turbine, selecting the other ones of the front line wind turbines to operate in the defensive mode based at least partially on respective distances between the other ones of the front line wind turbines and the selected first one of the front line wind turbines, and
  wherein upon detecting the extreme wind event, changing the operation of the unselected ones of the one or more first wind turbines.

13. The wind park of claim 12, wherein operating the front line wind turbines in the defensive mode includes at least one of:
  reducing a rotational speed reference for a rotor speed control algorithm;
  increasing a minimum pitch angle for a blade pitch control algorithm; and
  decreasing a power reference for a power level control algorithm relative to the non-defensive mode.

14. The wind park according to claim 12, wherein each of the plurality of wind turbines of the second type is configured to: detect an extreme wind event.

15. The wind park according to claim 14, wherein at least one of the one or more wind turbines of the first type is configured to receive a warning of the detected extreme wind event and to operate in the defensive mode in response to the warning.

16. The wind park according to claim 14, further comprising:
  a central controller configured to send the warning of the detected extreme wind event to the at least one of the one or more wind turbines of the first type.

17. The wind park according to claim 14, wherein each of the plurality of wind turbines of the second type is configured to begin operating in the defensive mode when disposed in a position furthest upstream relative to the measured wind direction or disposed within a threshold distance from the position.

18. A first wind turbine configured for placement in an outer region of a wind park including a plurality of wind turbines, the first wind turbine comprising:
  a climate condition sensor system configured to measure at least a wind direction of wind ambient to the first wind turbine; and
  a controller configured based on a relationship to cause the first wind turbine to begin operating in a defensive mode as a front line wind turbine as a precaution against an undetected extreme wind event, wherein the relationship associates operating the first wind turbine in the defensive mode according to the measured wind direction, wherein the relationship is independent of at least one of a prediction or a detection of an extreme wind event,
  wherein the controller is also configured to cause the first wind turbine to begin to operate in a defensive mode regardless of the measured wind direction, if a warning is received from a second wind turbine in the wind park of an approaching extreme wind event upon detecting the extreme wind event at the second wind turbine.

19. The first wind turbine according to claim 18,
  wherein the climate condition sensor system is further configured to detect an extreme wind event, and
  wherein the controller is further configured to generate a warning to transmit to at least a third wind turbine located downstream from the first wind turbine in response to the climate condition sensor system detecting an extreme wind event.

20. The first wind turbine of claim 18, further comprising a look-up table which is accessible to the controller, wherein the look-up table includes the relationship.

21. The first wind turbine of claim 20, wherein the controller is configured to override the look-up table by identifying a second wind turbine which is unable to detect an extreme wind event or the second wind turbine is unable to act in the defensive mode, and wherein the second wind turbine is disposed upstream and is identified as a front line wind turbine.

22. A first wind turbine configured for placement in an outer region of a wind park including a plurality of wind turbines comprising the first wind turbine and a second wind turbine, the first wind turbine comprising:
  a climate condition sensor system configured to measure at least a wind direction of wind ambient to the first wind turbine;
  a controller configured to cause the first wind turbine to begin operating in a defensive mode as a front line wind turbine as a precaution against an undetected extreme wind event and in dependence on the measured wind direction and, regardless of the measured wind direction, if a warning is received from the second wind turbine in the wind park of the approaching extreme wind event; and
  a look-up table which is accessible to the controller to identify whether the first wind turbine should operate as the front line wind turbine based on the measured wind direction,
  wherein the controller is configured to override the look-up table by identifying a second wind turbine which is unable to detect the extreme wind event or the second wind turbine is unable to act in the defensive mode, and wherein the second wind turbine is disposed upstream and is identified as a front line wind turbine.

* * * * *